United States Patent
Hu et al.

(10) Patent No.: US 6,835,478 B2
(45) Date of Patent: Dec. 28, 2004

(54) METHOD AND APPARATUS FOR FUEL CELL SYSTEM FAULT DETECTION

(75) Inventors: John Zhongzhi Hu, Niskayuna, NY (US); Nishith Pramod Vora, Niskayuna, NY (US); George Charles Goodman, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 253 days.

(21) Appl. No.: 10/166,937

(22) Filed: Jun. 11, 2002

(65) Prior Publication Data

US 2003/0228506 A1 Dec. 11, 2003

(51) Int. Cl.[7] .................................................. H01M 8/04
(52) U.S. Cl. ............................... 429/13; 429/22; 429/23; 429/24; 429/25
(58) Field of Search ............................. 429/13, 22, 23, 429/24, 25

(56) References Cited

U.S. PATENT DOCUMENTS 3,753,780 A * 8/1973 Fetterman .................... 429/23
6,413,662 B1 * 7/2002 Clingerman et al. ........... 429/25
6,461,751 B1 * 10/2002 Boehm et al. ................. 429/13

FOREIGN PATENT DOCUMENTS

| JP | 63-241873 | * 10/1988 | ............ H01M/8/04 |
| JP | 5-135793 | * 6/1993 | ............ H01M/8/04 |
| JP | 6-153403 | * 5/1994 | ............ H01M/8/00 |

* cited by examiner

Primary Examiner—Stephen J. Kalafut
(74) Attorney, Agent, or Firm—Ann M. Agosti; Patrick K. Patnode

(57) ABSTRACT

A method of detecting faults in a fuel cell system, the method comprising: comparing a plurality of fuel cell measurements to respective ones of a plurality of range limits to yield a plurality of range flags; differentiating the fuel cell measurements to yield a plurality of fuel cell rates; comparing the fuel cell rates to respective ones of a plurality of rate limits to yield a plurality of rate flags; and classifying the range flags and the rate flags to yield a fault detection decision.

20 Claims, 1 Drawing Sheet

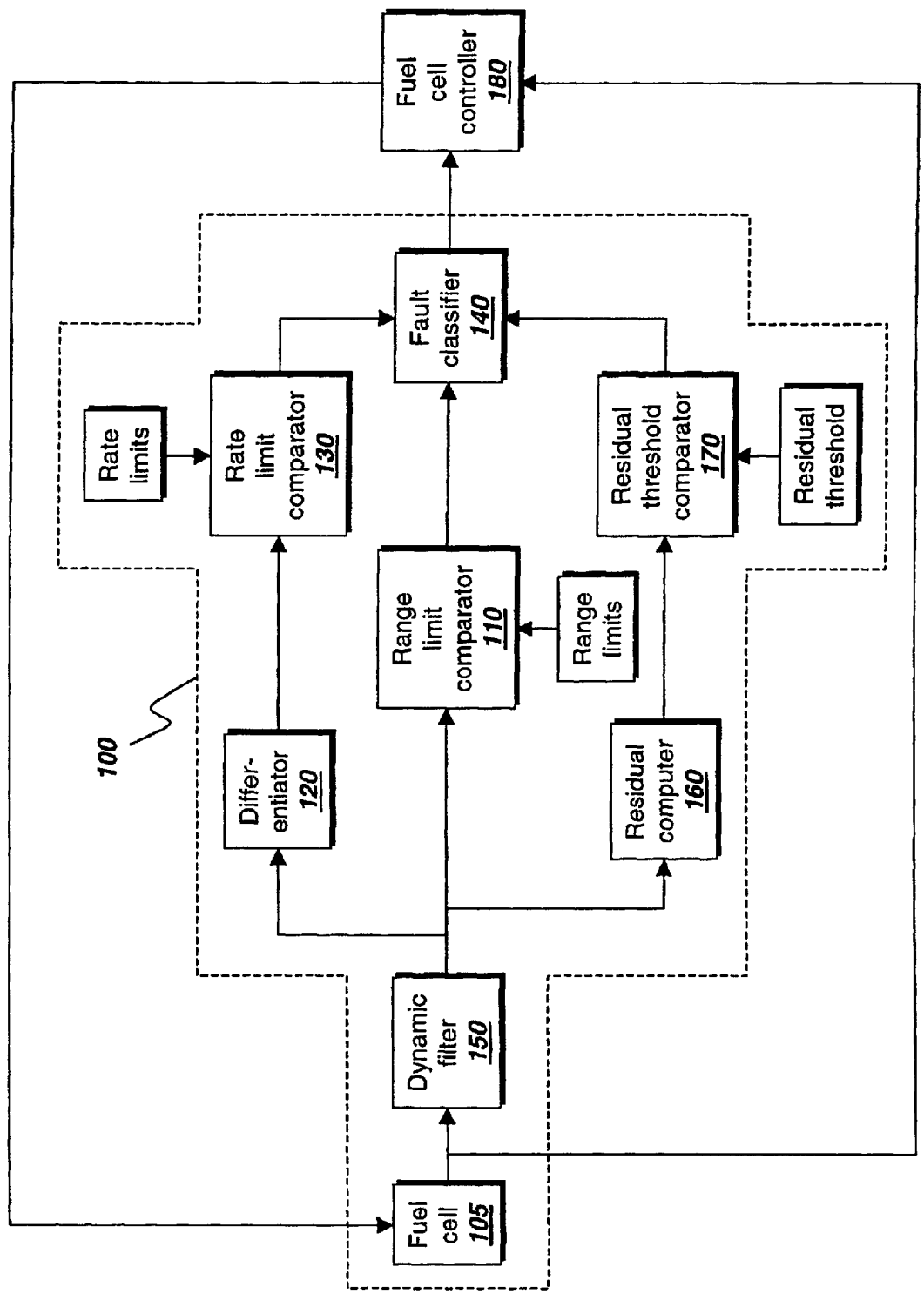

METHOD AND APPARATUS FOR FUEL CELL SYSTEM FAULT DETECTION

BACKGROUND

The present invention relates generally to the field of fuel cell systems and more specifically to fault detection in fuel cell systems.

In a wide variety of applications, fuel cells are used to provide relatively cleaner and higher efficiency electrical power compared to fossil fuel burning electrical power plants. A conventional fuel cell system comprises a fuel cell and a fuel cell controller.

The fuel cell typically comprises a means for bringing a fuel gas, typically hydrogen, and an oxidizer gas, typically air or oxygen, into contact with opposite faces of an electrolyte membrane. Chemical reaction develops a voltage across the membrane, and this voltage can be used to power external electrical devices. Byproducts of the reaction include chemical byproducts, typically water, and heat. Additionally, the fuel cell typically comprises numerous sensors for measuring critical operating parameters of the fuel cell and numerous actuators for modulating the fuel and oxidizer gas flows. The fuel cell controller typically comprises an electronic processor for implementing a nominal control strategy, where the nominal control strategy is an algorithm for calculating gas flow modulation from the measured operating parameters and from a set of desired operating parameters.

The nominal control strategy, however, assumes a normally working fuel cell. When fuel cell partial failures (also called "faults") occur, system performance generally tends to degrade. Such performance degradation arises from a combination of at least two causes: diminished fuel cell capability, and mismatch between the nominal control strategy and the dynamic behavior of the partially failed fuel cell. Where the second cause is a significant factor, if it were possible to detect and classify the fault, then it may also be possible to adopt an alternative control strategy tailored to the dynamic behavior of the partially failed fuel cell and thereby recover a portion of the lost performance. An opportunity exists, therefore, to improve the performance of some partially failed fuel cells by detecting fuel cell system faults.

SUMMARY

The opportunities described above are addressed, in one embodiment of the present invention, by a method of detecting faults in a fuel cell system, the method comprising: comparing a plurality of fuel cell measurements to respective ones of a plurality of range limits to yield a plurality of range flags; differentiating the fuel cell measurements to yield a plurality of fuel cell rates; comparing the fuel cell rates to respective ones of a plurality of rate limits to yield a plurality of rate flags; and classifying the range flags and the rate flags to yield a fault detection decision.

DRAWINGS

These and other features, aspects, and advantages of the present invention will become better understood when the following detailed description is read with reference to the accompanying drawings in which like characters represent like parts throughout the drawings, wherein:

The FIGURE illustrates a block diagram of an apparatus in accordance with one embodiment of the present invention.

DETAILED DESCRIPTION

In accordance with one embodiment of the present invention, the FIGURE illustrates a block diagram of an apparatus 100 comprising a fuel cell 105, a dynamic filter 150, a range limit comparator 110, a differentiator 120, a rate limit comparator 130, a residual computer 160, a residual threshold comparator 170, and a fault classifier 140. In operation, dynamic filter 150 performs dynamic filtering of a plurality of unfiltered fuel cell measurements from fuel cell 105 to yield a plurality of fuel cell measurements. Range limit comparator 110 compares the fuel cell measurements to respective ones of a plurality of range limits to yield a plurality of range flags. Differentiator 120 differentiates the fuel cell measurements to yield a plurality of fuel cell rates which rate limit comparator 130 compares to respective ones of a plurality of rate limits to yield a plurality of rate flags. From the fuel cell measurements, residual computer 160 computes a residual statistic which residual threshold comparator 170 compares to a residual threshold to yield a residual flag. Fault classifier 140 classifies the range flags, the rate flags, and the residual flag to yield a fault detection decision. In response to the fault detection decision, fuel cell controller 180 adopts a control strategy appropriate to the condition of fuel cell 105.

Fuel cell 105 comprises any device or system comprising a flowing fuel material, a flowing oxidizer material, and a catalyst material, and being configured to promote chemical reactions among the flowing fuel material, the flowing oxidizer material, and the catalyst material. Examples of fuel cell 105 include, without limitation, polymer electrolyte membrane fuel cells, alkaline fuel cells, phosphoric acid fuel cells, molten carbonate fuel cells, and solid oxide fuel cells.

As used herein, "dynamic filtering" refers to any process of calculating an output signal from present and past values of an input signal. Examples of dynamic filtering include, without limitation, discrete-time and continuous-time realizations of lowpass filters, bandpass filters, highpass filters, and Kalman filters and discrete-time rank filters including, without limitation, median filters, minimum filters and maximum filters. As used herein, "Kalman filtering" refers to any method of signal processing that utilizes a dynamic model propagated by calculating an innovation, wherein the innovation is the difference between an input signal and a signal estimate produced by the dynamic model. Examples of Kalman filters include, without limitation, Wiener filters, finite-horizon and infinite-horizon Kalman filters, Luenberger observers and extended Kalman filters.

As used herein, "differentiating" refers to any method of approximating a time derivative; examples include, without limitation, AC coupled filtering and backward differencing.

As used herein, "a residual statistic" is any mathematical quantity nominally zero when fuel cell 105 is operating normally, and nominally non-zero when fuel cell 105 exhibits a fault. Examples of computing residual statistics include, without limitation:

(1) using physical redundancy, for example, $S=V_1-V_2$, where $S, V_1, V_2 \in \Re$, denote a residual statistic, a fuel cell voltage measurement, and a redundant fuel cell voltage measurement, respectively, and $\Re$ denotes the set of real numbers;

(2) using analytical redundancy to statically or dynamically relate physical quantities, for example, $S=P-VI$, where $P, V, I \in \Re$ denote a power measurement, a voltage measurement, and a current measurement, respectively, or, for example, $$S = \frac{dx}{dt} - Ax - Bu,$$

where $x \in \Re^n$ is a fuel cell state vector (assumed measured), $u \in \Re^m$ is a fuel cell input vector (assumed measured), and $A \in \Re^{n \times n}$, $B \in \Re^{n \times m}$ define a linear fuel cell model; and (3) innovations of Kalman filters, for example $$S = Cz - y$$
$$\frac{dz}{dt} = Az + Bu + H(Cz - y)$$
$$y = Cx$$
$$\frac{dx}{dt} = Ax + Bu$$

where $z \in \Re^n$ is a Kalman filter state vector, $y \in \Re^p$ is a measured fuel cell output vector, $x \in \Re^n$ is a fuel cell state vector (assumed unmeasured), $C \in \Re^{p \times n}$ denotes a linear fuel cell model output matrix, and $H \in \Re^{n \times p}$ is a Kalman filter gain matrix.

As used herein, "range flags," "rate flags," and "residual flags" denote signals, possibly vector-valued, comprising respective binary signals having true values when range limit comparator 110, rate limit comparator 130, and residual threshold comparator 170 sense inputs greater than the range limits, rate limits, and residual threshold, respectively, and having false values, otherwise. The range flags, rate flags, and residual flags may also comprise auxiliary signals comprising, for example, the respective comparator input signals.

As used herein, "fault detection decision" refers to any signal used to communicate the condition of fuel cell 105 to fuel cell controller 180; examples include, without limitation, integer valued signals and decoded binary signals. As used herein, "classifying the range flags, rate flags, and residual flag" denotes any method of statically mapping the flags into the fault detection decision; examples include, without limitation, combinational (combinatorial) logic, decision trees, and table look-up.

Range limit comparator 110, differentiator 120, rate limit comparator 130, fault classifier 140, dynamic filter 150, residual computer 160, and residual threshold comparator 170 comprise any electrical or electronic device or system capable of performing the indicated functions. Examples include, without limitation, analog electronic computation modules and digital electronic computation modules (digital computers) including, without limitation, array processors, microcomputers, microprocessors, microcontrollers, and single-chip digital signal processors (DSPs).

In a more detailed embodiment in accordance with the embodiment in the FIGURE, fuel cell measurements comprise at least one quantity selected from a group consisting of voltage, temperature, power, current, pressure, gas flow, and concentration. These fuel cell measurements may refer to multiple quantities local to individual cells, or quantities global to stacks of cells in fuel cell 105.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of detecting faults in a fuel cell system, said method comprising:
   comparing a plurality of fuel cell measurements to respective ones of a plurality of range limits to yield a plurality of range flags;
   differentiating said fuel cell measurements to yield a plurality of fuel cell rates;
   comparing said fuel cell rates to respective ones of a plurality of rate limits to yield a plurality of rate flags; and
   classifying said range flags and said rate flags to yield a fault detection decision.

2. The method of claim 1 wherein said fuel cell measurements comprise at least one quantity selected from a group consisting of voltage, temperature, power, current, pressure, gas flow, and concentration.

3. The method of claim 1 further comprising dynamic filtering a plurality of unfiltered fuel cell measurements to yield said fuel cell measurements.

4. The method of the previous claim wherein said step of dynamic filtering comprises at least one method selected from a group consisting of lowpass filtering, bandpass filtering, highpass filtering, Kalman filtering, and rank filtering.

5. The method of claim 1 further comprising:
   computing a residual statistic from said fuel cell measurements; and
   comparing said residual statistic to a residual threshold to yield a residual flag,
   said step of classifying comprising using said residual flag.

6. The method of the previous claim wherein said step of computing comprises a method selected from a group consisting of physical redundancy, analytical redundancy, and Kalman filtering.

7. A method of detecting faults in a fuel cell system, said method comprising:
   dynamic filtering a plurality of unfiltered fuel cell measurements to yield a plurality of fuel cell measurements;
   comparing said fuel cell measurements to respective ones of a plurality of range limits to yield a plurality of range flags;
   differentiating said fuel cell measurements to yield a plurality of fuel cell rates;
   comparing said fuel cell rates to respective ones of a plurality of rate limits to yield a plurality of rate flags;
   computing a residual statistic from said fuel cell measurements;
   comparing said residual statistic to a residual threshold to yield a residual flag; and
   classifying said range flags, said rate flags, and said residual flag to yield a fault detection decision.

8. The method of claim 7 wherein said unfiltered fuel cell measurements comprise at least one quantity selected from a group consisting of voltage, temperature, power, current, pressure, gas flow, and concentration.

9. The method of claim 7 wherein said step of dynamic filtering comprises at least one method selected from a group consisting of lowpass filtering, bandpass filtering, highpass filtering, Kalman filtering, and rank filtering.

10. The method of claim 7 wherein said step of computing comprises a method selected from a group consisting of physical redundancy, analytical redundancy, and Kalman filtering.

11. An apparatus comprising:

a fuel cell;

a range limit comparator adapted for comparing a plurality of fuel cell measurements, from said fuel cell, to respective ones of a plurality of range limits to yield a plurality of range flags;

a differentiator adapted for differentiating said fuel cell measurements to yield a plurality of fuel cell rates;

a rate limit comparator adapted for comparing said fuel cell rates to respective ones of a plurality of rate limits to yield a plurality of rate flags; and a fault classifier adapted for classifying said range flags and said rate flags to yield a fault detection decision.

12. The apparatus of claim 11 wherein said fuel cell measurements comprise at least one quantity selected from a group consisting of voltage, temperature, power, current, pressure, gas flow, and concentration.

13. The apparatus of claim 11 further comprising a dynamic filter adapted for dynamic filtering a plurality of unfiltered fuel cell measurements from said fuel cell to yield said fuel cell measurements.

14. The apparatus of the previous claim wherein said dynamic filter implements at least one method selected from a group consisting of lowpass filtering, bandpass filtering, highpass filtering, Kalman filtering, and rank filtering.

15. The apparatus of claim 11 further comprising:

a residual computer adapted for computing a residual statistic from said fuel cell measurements; and a residual threshold comparator adapted for comparing said residual statistic to a residual threshold to yield a residual flag, said fault classifier using said residual flag.

16. The apparatus of the previous claim wherein said residual computer is further adapted to implement at least one method selected from a group consisting of physical redundancy, analytical redundancy, and Kalman filtering.

17. An apparatus comprising:

a fuel cell;

a dynamic filter adapted for dynamic filtering a plurality of unfiltered fuel cell measurements from said fuel cell to yield a plurality of filtered fuel cell measurements;

a range limit comparator adapted for comparing said filtered fuel cell measurements to respective ones of a plurality of range limits to yield a plurality of range flags;

a differentiator adapted for differentiating said filtered fuel cell measurements to yield a plurality of fuel cell rates;

a rate limit comparator adapted for comparing said fuel cell rates to respective ones of a plurality of rate limits to yield a plurality of rate flags;

a residual computer adapted for computing a residual statistic from said filtered fuel cell measurements;

a residual threshold comparator adapted for comparing said residual statistic to a residual threshold to yield a residual flag; and a fault classifier adapted for classifying said range flags, said rate flags, and said residual flag to yield a fault detection decision.

18. The apparatus of claim 17 wherein said unfiltered fuel cell measurements comprise at least one quantity selected from a group consisting of voltage, temperature, power, current, pressure, gas flow, and concentration.

19. The apparatus of the claim 17 wherein said dynamic filter implements at least one method selected from a group consisting of lowpass filtering, bandpass filtering, highpass filtering, Kalman filtering, and rank filtering.

20. The apparatus of the claim 17 wherein said residual computer is further adapted to implement at least one method selected from a group consisting of physical redundancy, analytical redundancy, and Kalman filtering.

* * * * *